United States Patent [19]
Pickford et al.

[11] 3,912,248
[45] Oct. 14, 1975

[54] SLAM/SHOCK ISOLATION PEDESTAL

[75] Inventors: Edward V. Pickford, Potomac; Richard M. Mahone, Rockville; Herbert L. Wolk, Silver Spring, all of Md.

[73] Assignee: The United States of America as represented by the Secretary of the Navy, Washington, D.C.

[22] Filed: Mar. 26, 1974

[21] Appl. No.: 454,886

[52] U.S. Cl. ............................... 267/131; 248/400
[51] Int. Cl.² .......................................... F16F 13/00
[58] Field of Search .......... 267/131, 133, 142, 117, 267/120, 121; 248/400, 402, 399; 297/345, 216; 188/285

[56] References Cited
UNITED STATES PATENTS

| | | | |
|---|---|---|---|
| 2,573,077 | 10/1951 | White et al. | 248/400 |
| 3,632,077 | 1/1972 | Hall et al. | 267/131 |
| 3,758,064 | 9/1973 | Sawaki | 248/400 |

*Primary Examiner*—James B. Marbert
*Attorney, Agent, or Firm*—R. S. Sciascia; Q. E. Hodges

[57] ABSTRACT

A mount for a chair, piece of machinery, etc. that is exposed to rapid low-acceleration slams and intermittent high-acceleration shocks. The mount has a spring which absorbs the rapid slams and a hydraulic or pneumatic dashpot which absorbs the shocks; the dashpot does not function over the first increment of travel of the mount, thereby allowing rapid recycling of the mount under conditions of rapidly applied slams.

6 Claims, 2 Drawing Figures

SLAM/SHOCK ISOLATION PEDESTAL

The invention described herein may be manufactured and used by or for the Government of the United States of America for governmental purposes without the payment of any royalties thereon or therefor.

BACKGROUND

The present invention is an acceleration absorbing mount for use in an environment that contains acceleration inputs of varying magnitude and varying time periods between inputs. For example, it could be on a small high-speed gunboat; such a craft is exposed to relatively small rapid slams when it travels on rough water at high speed, plus large shocks from underwater explosions due to enemy action. An acceleration absorbing mount that is "tuned" to the frequency and amplitude of the wave-induced slams would not be able to cope with the large shocks; likewise a mount that was stiff enough to absorb the large shocks would transmit the small slams unattenuated.

A further difficulty arises from the fact that the small slams occur much more rapidly than the shocks; thus the mount must be able to recycle itself at two different speeds.

The prior art shows crash seats which have the capability of absorbing small slams; it also shows seats which can absorb the momentum of the seat and its occupant in the event of a disastrous crash of the vehicle. However, it does not show a recycling device such as the present invention because the prior art vehicles which incorporated crash seats were destroyed by the event which caused the high-acceleration input to the seat. As stated, however, the present invention can be used in a small gunboat; such a gunboat can survive a succession of near misses by enemy ordnance, although the boat and its contents will be severely jolted by each of the near misses. A seat for such a boat must be able to recycle itself after each severe shock or jolt, and also absorb the small slams generated when the boat moves through rough water at high speed.

SUMMARY

Briefly, the present invention is a mount for a chair, instrument, etc. which can absorb high frequency low amplitude slams as well as low frequency high amplitude shocks. It comprises a compression spring which supports the chair, and a hydraulic or pnuematic dashpot which is in parallel with the spring but which does not operate until the chair has moved a variable pre-set minimum distance. The spring alone absorbs the small slams, and the spring and dashpot together absorb the large shocks; the dashpot absorbs motion in both directions, so that after a shock there is a gradual rather than a violent return to the original position. There is also a provision for varying the amount of pre-load on the spring, to allow for different weights to be supported and isolated.

OBJECTS OF THE INVENTION

Accordingly, it is an object of the present invention to provide an improved acceleration absorbing mount.

It is a further object to provide an acceleration absorbing mount capable of absorbing accelerations of widely varying magnitude.

It is a further object to provide an acceleration absorbing mount having a plurality of absorbing means which operate in parallel over less than the full range of motion of the mount.

It is a further object to provide an acceleration absorbing mount having a plurality of absorbing means which operate in stages over their initial ranges of operation but which operate in parallel over their final ranges of operation.

Other objects and advantages of the present invention will be obvious from the following specification and accompanying drawings.

DESCRIPTION OF THE PREFERRED EMBODIMENT

Figures 1, 2:
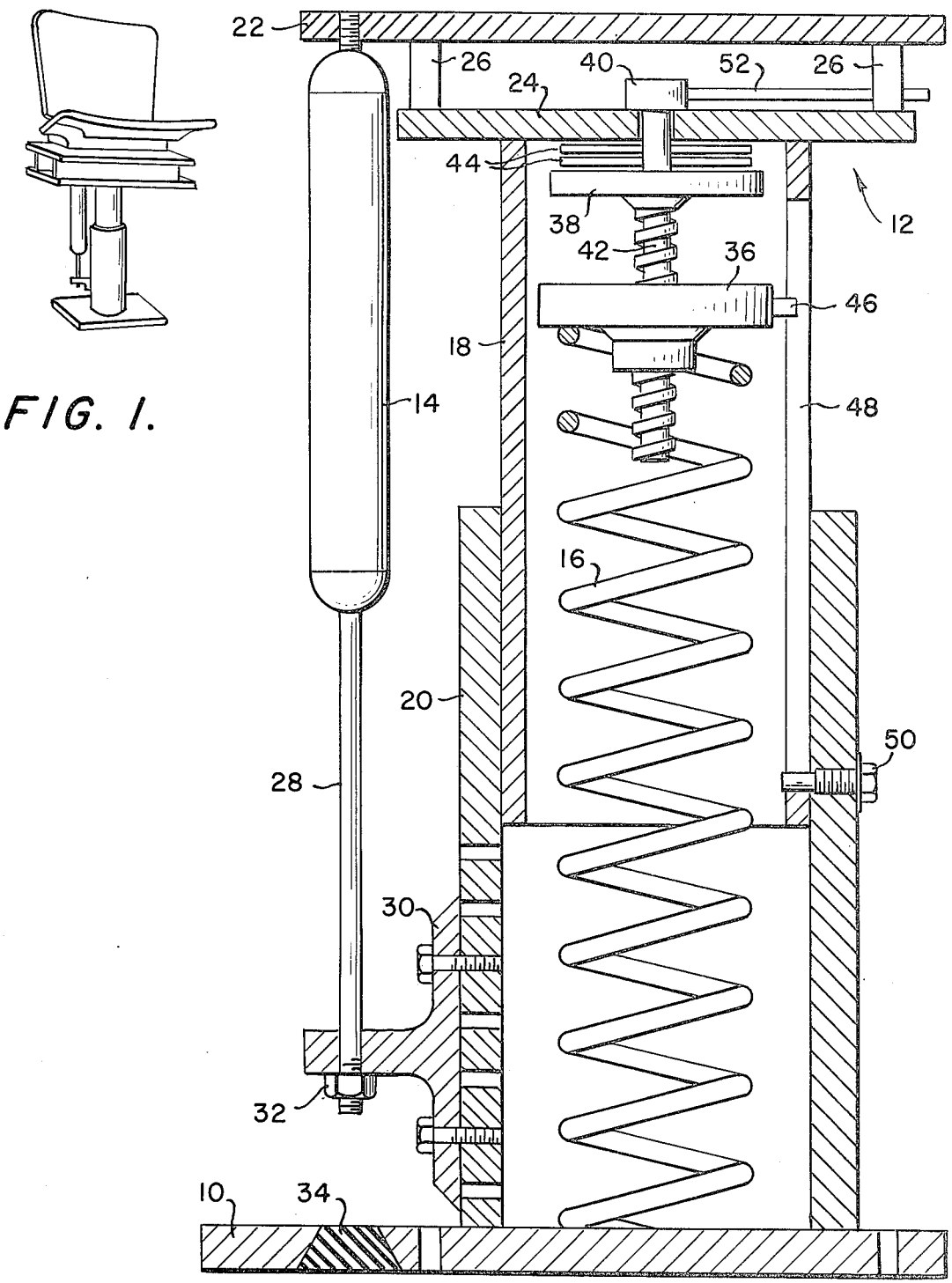
FIG. 1 shows the acceleration absorbing mount of the present invention utilized as a support for a chair.
FIG. 2 is a cut-away view of the mount showing its operative parts.

FIG. 1 shows the mount of the present invention supporting a chair; however, it may be utilized to support any object which must be isolated from accelerations that cover a range of magnitudes.

FIG. 2 shows the operative parts of the mount. The mount comprises a base 10 and an object supporting platform 12 which are isolated from each other by a dashpot 14 and a compression spring 16. Spring 16 is enclosed by telescoping tubes 18 and 20 which are fixed, respectively, to the object supporting platform and the base.

Object supporting platform 12 is comprised of upper plate 22 and lower plate 24 which are fixed to blocks 26. The upper end of dashpot 14 is fixed to upper plate 22 as shown; the lower end of rod 28 of dashpot 14 passes through a hole in bracket 30 which is bloted or otherwise adjustably fixed to lower cylinder 20. Nut 32 on rod 28 prevents it from being drawn completely through the hole, as will be explained later. Directly below the end of rod 28 is a solid piece of rubber or other elastomeric material 34 in base 10, for a purpose to be explained later.

The lower end of spring 16 rests on base 10; the upper end bears against sliding disc 36, which is part of a mechanism to allow a variable pre-load to be imposed on spring 16. This mechanism is comprised of sliding disc 36, rotating disc 38, ratchet mechanism 40, and partially threaded shaft 42. Rotating disc 38 and ratchet mechanism 40 are fixed to the unthreaded part of shaft 42, while sliding disc 36 is carried by the threaded portion of shaft 42. Nylon or other washers 44 reduce friction between rotating disc 38 and lower plate 24. Projection 46 on sliding disc 36 rides in slot 48 of cylinder 18 and keeps disc 36 from turning, as will be explained later. The unthreaded end of bolt 50, which rides in this slot, limits the upward travel of cylinder 18.

Operation of the device is as follows. The desired amount of pre-load is applied to spring 16 by turning ratchet 40 by means of handle 52; this turns shaft 42, which causes sliding disc 36 to move up or down and change the compression in spring 16 before a load is applied. No other adjustment is necessary after the pre-load has been applied.

If it is assumed that the mount supports a seat in a small gunboat moving at high speed across rough water, base 10 will receive a series of fast low-level slams due to the waves. Base 10 will be displaced up against spring 16, which will absorb the energy of the slams. Dashpot 14 will not operate unless the base is displaced up more than the distance between the end of rod 28 and base 10, which should not occur under the action of waves alone.

Underwater explosions may occur near the boat and such explosions may not be severe enough to destroy it, but which may cause a large shock to impact on the hull and result in violent deck motions. This will be enough to compress spring 16 a considerable amount; when base 10 moves up, rubber block 34 contacts rod 28 and dashpot 14 then also absorbs the acceleration. The purpose of rubber block 34 is to cushion the blow on rod 28, rather than to absorb some of the acceleration. After the dashpot and spring have absorbed all of the acceleration, the spring will attempt to drive base 10 and object supporting platform 12 apart. The two will move freely until bracket 30 contacts nut 32 on rod 28; from that point on, dashpot 14 will reduce the speed of separation to an acceptable value and prevent the imposition of a negative acceleration on the occupant of the seat. During the time that the spring is returning the seat to its rest position, it is able to absorb the small slams due to wave action; it is also able to absorb the large shocks without being recycled to the original position. Thus, the mount of the present invention is always in condition to absorb either small or large acceleration inputs, and in whatever sequence they occur.

Obviously, the rate of absorption of dashpot 14 can be made variable, as in the case of automobile shock absorbers whose stiffness can be varied. This can be accomplished by incorporating a variable area orifice within dashpot 14.

The amount of lost motion between base 10 and dashpot 14 can also be varied, merely by adjusting the position of bracket 30 on cylinder 20. This will determine the distance that base 10 moves before dashpot 14 begins to absorb the acceleration.

Obviously, many modifications and variations of the present invention are possible in the light of the above teachings. It is therefore to be understood that within the scope of the appended claims the invention may be practiced otherwise than as specifically described.

What is claimed is:

1. An acceleration absorbing mount, comprising:
a base and an object supporting platform joined to said base by first means for absorbing accelerations plus second means for absorbing accelerations, said second means acting in parallel with said first means and being connected to said mount by a lost motion connection to render said second acceleration absorbing means inoperative over the first portion of travel of said object supporting platform, both of said acceleration absorbing means automatically recycling to their initial position between accelerations.

2. An acceleration absorbing mount as in claim 1 wherein the rate of absorbtion of said second means differs from that of said first means.

3. An acceleration absorbing mount as in claim 2 wherein said first absorbing means is a resilient member.

4. An acceleration absorbing mount as in claim 3 wherein said second absorbing means is a dashpot.

5. An acceleration absorbing mount as in claim 4 including means to change the rate of absorbtion of said resilient member.

6. An acceleration absorbing mount as in claim 5 including means to change the rate of absorption of said dashpot.

* * * * *